W. Stockwell,
Tile Machine.

No 4,220. Reissued Dec. 27. 1870.

Witness
George E. Reid
Wm Franklin Lacey

Inventor
John W. Stockwell
By Wm Henry Bliss Atty

N. PETERS, PHOTO-LITHOGRAPHER, WASHINGTON, D. C.

BEST AVAILABLE COPY

BEST AVAILABLE COPY

UNITED STATES PATENT OFFICE.

JOHN W. STOCKWELL, OF PORTLAND, MAINE.

IMPROVEMENTS IN WATER-PIPE MACHINES.

*Specification forming part of Letters Patent No.* 106,424, *dated August* 16, 1870; *reissue No.* 4,220, *dated December* 27, 1870.

*To all whom it may concern:*

Figure 4:
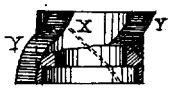
Figure 3:
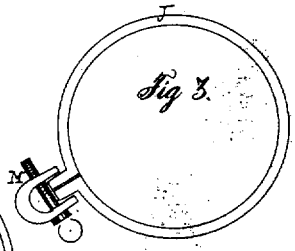
Figure 2:
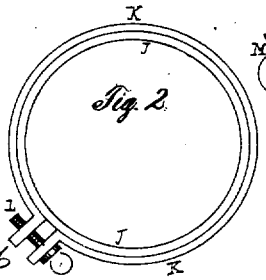

Be it known that I, JOHN W. STOCKWELL, of Portland, in the county of Cumberland and State of Maine, have invented a new and useful Improved Water-Pipe Machine; and I do hereby declare the following to be a full, clear, and exact description thereof, reference being [redacted] accompanying drawing, in which— [redacted] il section of my [redacted] ng broken away [redacted] Fig. 2 is an end [redacted] mold. Fig. 3 is [redacted] tion of the same; and Fig. 4 is a side view, partly in section, of the device for forming the tip upon the pipe.

Same letters refer to like parts.

My invention relates to a drain-pipe machine, and consists of the following improvements: first, in combining with a suspended oscillating hopper an auxiliary plate and adjustable slide, in a new and improved manner; second, in the combination of a rotary vertical slotted shaft, a core, a case, a rotary sleeve, which is pushed up through the case as the pipe is manufactured, and rotating packers or trowels attached to said sleeve; third, in an improved tubular shouldered tool, having inclined cutters on its outer face.

The kind of pipes—viz., drain and similar pipes—to which my machine has reference is at present manufactured by filling the material into an outer casing having an internal core, and then tamping or beating down the material by means of a tamping stick or iron held in the hands of the workman. The result of this imperfect method is that the material is packed in a state of unequal density throughout the pipe, as it is not the case that the workman strikes blows of equal force and frequency upon all parts of the pipe during its construction, leaving frequent weak and porous places. The pressure of my trowels is all the time perfectly uniform upon all points of the pipe, can be regulated as desired, and their movements remedies defects of previous mixture; and, moreover, my method of manufacture is much more rapid than that by hand.

In the accompanying drawing, A represents the frame-work of the machine or building. B is the driving-shaft, which may be driven by any convenient power, and to which the pow[redacted] may be applied by a pulley, by gear-wheels, [redacted] by other convenient means. To the [redacted] end of the [redacted] C, arou[redacted] passes [redacted] per end [redacted] revolves [redacted] frame-w[redacted] lower end of whi[redacted] hangs free, and has a pin or pivot formed in [redacted] attached to the center of its lower end, whi[redacted] may enter a socket in the end of the core G [redacted] the mold. The core G is made of the exa[redacted] shape and size that the interior of the pi[redacted] should have. The lower end of the core G passes through and fits into a hole in the base-plate H of the mold. The base-plate H of the mold is secured in a hole or recess in the platform I, which is supported upon the floor or platform *a'* of the frame-work A, so that the lower end of the core G may rest upon the said floor or platform *a'*.

The platform I may be mounted upon small wheels or rollers for convenience in removing and replacing it as required.

The base-plate H is made with an interior shoulder around its central hole, to form the socket or recess in one end of the pipe to receive the tip of the end of the adjacent length of the pipe. The base-plate H is also formed with an exterior shoulder to receive the lower end of the case J of the mold.

Figure 1:
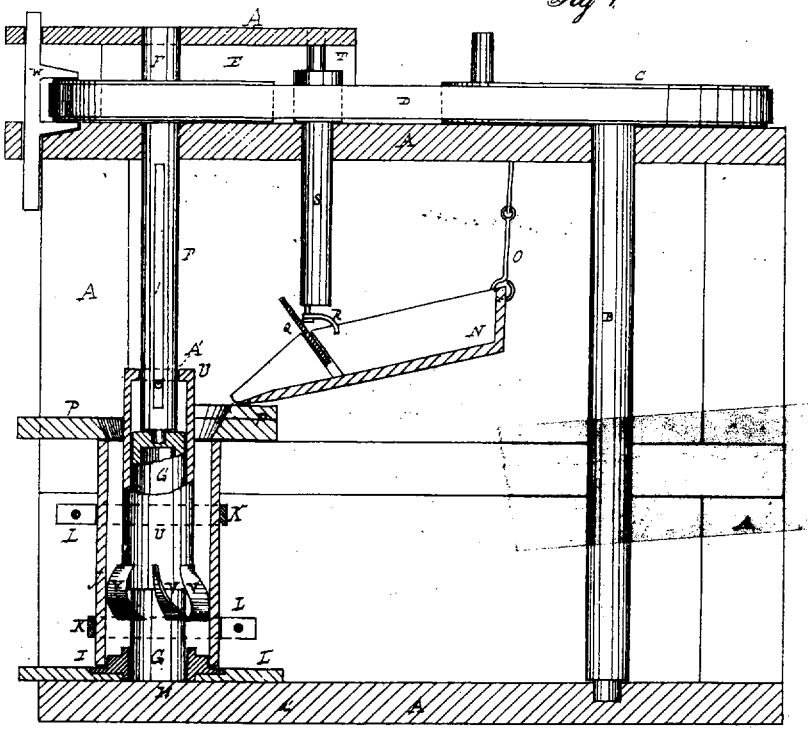

The case J may be made of a sheet of sheet metal, bent into a cylindrical form, with edges capable of fitting each other, and the edges may be held together while the material of the pipe is being packed into it by the bands K, two or more of which are passed around it, and the ends of which are bent outward, as shown in Figs. 1 and 2, to receive clamping-screws L, which are riveted to one end, and screw into the other end of said bands.

By adjusting the bands K so that their open ends may be on opposite sides of the case J, as seen in Fig. 1, the said projecting ends may serve as handles for convenience in moving the mold.

By this contrivance, when the material of which the pipe is formed has set, the core G is pushed out, the screws L are loosened, al-

BEST AVAILABLE COPY lowing the bands K to be removed, when the case, if made of sheet metal, will expand or open somewhat, in consequence of the natural elasticity of the metal of which it is made, and then it may be removed from the pipe.

Another method of effecting the same is by bending outward the edges of the open case J, and securing the same to each other by two or more screw-clamps, M, Fig. 3, which hold the two edges together, and enable the case to be easily and surely adjusted in its proper place.

The prepared material is fed into the mold from the hopper N, the rear end of which is hung from the frame A by a jointed rod or rods, O, and the forward and lower end of which [illegible]s upon the platform P in such a position [illegible]t the material may pass from the hopper [illegible] hopper-shaped hole in the central [illegible]

[illegible] from [illegible] Q, the [illegible] in the [illegible]

The ends of the sliding [illegible] split, and their [illegible]er parts are turned a little outward, so as [illegible]press against the sides of the grooves, and [illegible]us hold the slide securely in any position in [illegible]ich it may be adjusted.

To one side of the hopper N is pivoted one end of the rod R, the other end of which is pivoted eccentrically to the lower end of the shaft S, the upper end of which revolves in bearings in the frame A in such a position that the pulley T, secured to the upper part of said shaft, may bear against the band D, so that the movement of the said band D may revolve the shaft S, and thus shake the hopper N; or the motion thus imparted to the hopper may be obtained in any equally convenient manner.

A part or the whole of the platform P should be detachable, so that it can be conveniently removed for convenience in removing and adjusting the mold.

U is a sleeve, fitting over the core G and the shaft F. The shaft F has the longitudinal slot, slots, or grooves 1. The sleeve U has one or more pins or studs fitting into the said slots or grooves, so that the rotation of the shaft is communicated to the sleeve; at the same time the sleeve may slip up on the shaft F as fast as the material is filled in under the trowels V. The sleeve U, with its trowels, is thus pushed upward through the case J by the progress of the formation of the pipe under the trowels or packers, the same rotating meanwhile so as to pass down and pack the cement of the pipe. The trowels are attached to the lower end of the sleeve, and are made of such curvilinear form that the material of the pipe passing down between them to be packed is not carried around with them as they rotate, but drops down, and is immediately worked by them into place. The material is thus packed evenly and closely into place, the trowels filling, or nearly filling, the mold or case.

In the case of oval pipe, the trowels may be so arranged in the sleeve U as to pass around and within an oval case, and adjust themselves to such a form.

The shaft F may be raised to disconnect it from the core G by the shifter W, as shown in Fig. 1. When this is done, the tube U and its attached trowels are raised and held suspended by a suitable catch attached to the frame-work A. The tool X is then placed on the upper end of the core G, and turned around by hand or by lowering the shaft F down upon it, and revolving it by the movement of the machine.

The tool X is made in the form of a short tube, having a shoulder upon the inner [illegible] its lower end, and [illegible] trowels Y formed [illegible] outer side, which, [illegible] away and remove [illegible] end of the pipe, u[illegible] comes in contact [illegible] the top of the pipe and stops the action of the tool. A few turns of the tool backward smooths off the end of the pipe, and leaves the tip perfectly formed.

I do not claim the bands K by themselves.

It is apparent that the trowels may be stationary while a part or the whole of the material is fed into the case.

What I claim as my invention, and desire to secure by Letters Patent of the United States, is—

1. The suspended and oscillating hopper N, adjustable slide Q, and auxiliary hopper-plate, all constructed and relatively arranged to form an improved feeding device for a pipe-molding machine.

2. The core G, grooved or slotted vertical rotary shaft P, rotary sleeve U, with its stud or pin A′ and the trowels V, all constructed, combined, and operating substantially as and for the purposes herein set forth.

3. The device X Y, for forming the tip of the pipe, constructed and operated substantially as described and shown herein.

JOHN W. STOCKWELL.

Witnesses:

WM. FRANKLIN SEAVEY,
GEORGE E. BIRD.